3,055,849
HALOGEN CONTAINING POLYURETHANE
FOAMS AND PROCESS FOR PREPARING
SAME
Raymond R. Hindersinn, Lewiston, and Michael Worsley, Niagara Falls, N.Y., assignors to Hooker Chemical Corporation, Niagara Falls, N.Y., a corporation of New York
No Drawing. Filed Nov. 18, 1959, Ser. No. 853,688
11 Claims. (Cl. 260—2.5)

This invention relates to novel foamable polyurethane compositions and to the polyurethane foams prepared therefrom. More particularly the present invention resides in halogen containing foamable polyurethane compositions having co-reacted therein a polyhydric alcohol derived from hexahalocyclopentadiene, said foamable composition and resultant polyurethane foam having a high halogen content and prepared from substantially liquid reaction products.

The methods of the prior art have attained fire-resistance in urethane foams by the use of various plasticizing substances, such as the various phosphate or phosphonate esters or chlorinated compounds. However, such plasticizing substances are additives which are not chemically combined with the polyurethane plastic and are progressively lost from the plastic by evaporation, leaching, etc. Consequently, the product does not have a permanently reduced flammability. Furthermore, the plasticizing additive affects the physical properties of the product. Alternatively, the art has incorporated chlorine containing compounds into the resultant product, for example, S.N. 623,795, "Fire Resistant Foams," filed November 23, 1956. This method, although it overcomes the disadvantages inherent in the use of plasticizing substances, suffers from the serious disadvantage that the incorporation of the chlorine containing compound into the polyester causes a rapid increase in viscosity, and solid compositions usually result at a chlorine content greater than fifteen percent, therefore requiring special handling in order to obtain a polyurethane foam of high chlorine content.

Most flexible polyurethane foams are claimed to be fire resistant per se and, therefore, very little has been done to increase the fire resistance of these materials. The claimed fire resistance, however, usually is based on the fact that such materials are self extinguishing when the foams are ignited by virtue of the fact that the burning elastomeric material melts and falls away from the article thus extinguishing the flame. The melt, however, is flammable and will burn if ignited.

It is, therefore, an object of the present invention to provide a foamable polyurethane composition which is useful in the preparation of flame retardant, rigid and flexible polyurethane foams. It is a further object of the present invention to provide a foamable composition having a high halogen content, which foamable composition contains co-reacted therein a halogen containing polyhydric alcohol derived from hexahalocyclopentadiene. It is a still further object of the present invention to provide a foamable composition which satisfies the aforementioned objects and which foamable composition is comprised of reactants which are substantially liquid at room temperature, thereby providing a system which may be handled by conventional metering and pumping equipment. It is a further object of the present invention to provide a foamable composition from which flame retardant polyurethane foams may be easily and inexpensively prepared, while having excellent physical characteristics. An additional object of the present invention is to prepare truly fire resistant polyurethane foams which are non-flammable in the solid or molten state. Further objects and advantages of the present invention will appear hereinafter.

In accordance with the present invention it has been found that foamable polyurethane compositions satisfying the aforementioned objects may be prepared by reacting together: (I) the liquid resinous reaction product of (A) a halogen containing polyhydric alcohol derived from hexahalocyclopentadiene, wherein the halogen is selected from the group consisting of chlorine, bromine, fluorine and mixtures thereof, and (B) an organic polyisocyanate; and (II) a hydroxyl containing polymeric material having a hydroxyl number of between thirty and six hundred and fifty selected from the group consisting of (A) a polyester comprising the reaction product of a polyhydric alcohol and a polycarboxylic compound, (B) a polyether comprising the reaction product of a monomeric 1,2-epoxide and a material selected from the group consisting of a polyhydric alcohol and a polycarboxylic acid, and (C) mixtures thereof; and (III) a foaming agent.

The diisocyanate or polyisocyanate that may be employed is preferably liquid in order to readily react with the solid halogen containing polyhydric alcohol. Aromatic isocyanates are preferred because they are more reactive and less toxic than the aliphatic members. Typical isocyanates include the following: 2,4-tolylene diisocyanate; 2,6-tolylene diisocyanate; hexamethylene diisocyanate; ethylene diisocyanate; trimethylene diisocyanate; tetramethylene diisocyanate; pentamethylene diisocyanate; 1,2-propylene diisocyanate; 1,2-butylene diisocyanate; 2,3-butylene diisocyanate; 1,3-butylene diisocyanate; the liquid reaction products of (1) diisocyanates and (2) polyols of polyamines, etc. In addition, mixtures of isocyanates may be employed. The preferred isocyanates are the diisocyanates, especially mixtures thereof, because they are readily available commercially.

Typical halogen containing polyhydric alcohols derived from hexahalocyclopentadiene are (1) the reaction products of hexahalocyclopentadiene and a dihydric alcohol containing aliphatic carbon to carbon unsaturation and (2) the reaction products of decachlorooctahydro-1,3,4-metheno-2H-cyclobuta[cd]-pentalene-2-one and a polyhydric alcohol containing at least three hydroxyl groups. Exemplificative reaction products of hexahalocyclopentadiene and a dihydric alcohol are: 1,4,5,6,7,7-hexachloro-2,3 - bis - hydroxymethylbicyclo - (2.2.1) - 5 - heptene; 1,4,5,6,7,7 - hexabromo - 2,3 - bis - hydroxymethylbicyclo-(2.2.1) - 5 - heptene; 1,4,5,6 - tetrachloro - 7,7 - difluoro-2,3 - bis - hydroxymethylbicyclo - (2.2.1) - 5 - heptene; 3 - (1,4,5,6 - tetrachloro - 7,7 - difluorobicyclo - (2.2.1)-5 - heptene - 2 - yl) - methoxy - 1,2 - propane diol; 3 - (1,4,5,6,7,7 - hexachlorobicyclo - (2.2.1) - 5 - heptene-2-yl)-methoxy-1,2-propane diol. The preparation of these compounds is disclosed in copending application Serial Number 308,922 for "Polyhalogen-Containing Polyhydric Compounds," filed September 10, 1952, by Paul Robitschek et al., now U.S. Patent 3,007,958. Typical dihydric alcohols which may be reacted with hexahalocyclopentadiene are: butenediol; allyl glycerol ether; pentenediol; 1,2 - bis - (hydroxymethyl) - cyclohexene - 4; 1,2-bis - (hydroxymethyl) - cyclohexadiene - 1,4; 1,2 - bis-(hydroxymethyl) - bicyclo - (2.2.1) - heptene - 4; cis-1,2-dihydroxycyclopentene-3; and more generally those of the lower aliphatic and alicyclic series having at least one reactive unsaturated carbon-to-carbon bond and at least two hydroxy groups. Halogenated dihydric compounds may also be advantageously used, for example: 1,4-dihydroxy - 2 - chlorobutene - 2; 1,5 - dihydroxy - 2,4-dichloropentene - 2; 1,2 - bis - (hydroxymethyl) - 4-chlorocyclohexene - 4; 1,2 - bis - (hydroxymethyl) - 4- chlorocyclohexadiene - 1,4; 1,2 - bis - (hydroxymethyl)-4-chlorobicyclo-(2.2.1)-heptadiene-1,4; etc.

Typical polyhydric alcohols used in the preparation of the reaction products of decachlorooctahydro-1,3,4-metheno-2H-cyclobuta[cd]-pentalene-2-one and a trihydric alcohol are: glycerol; butanetriol; hexanetriol; trimethylol propane; trimethylol ethane; pentaerythritol; dipentaerythritol; etc. Decachlorotetrahydro-4,7-methanoindeneone is the name formerly given to decachlorooctahydro - 1,3,4 - metheno- 2H - cyclobuta[cd] - pentalene-2-one and may be prepared by treating hexachlorocyclopentadiene with sulfur trioxide. The polyol derivatives may be easily prepared by refluxing decachlorooctahydro - 1,3,4 - metheno - 2H - cyclobuta[cd] - pentalene-2-one and the desired polyol in carbon tetrachloride. The products are readily crystallized.

In the preparation of the liquid resinous reaction product of the halogen containing polyhydric alcohol with an organic polyisocyanate, the halogen containing polyhydric alcohol is added to the isocyanate, preferably portionwise, at a temperature of from about thirty to one hundred and twenty degrees centigrade. Higher or lower temperatures may be used as desired. The ratios employed of halogen containing polyhydric alcohol to polyisocyanate are such as to provide one hydroxyl group to at least four isocyanato groups. After the polyisocyanate and the halogen containing polyhydric alcohol are mixed together, the reaction product is heated at a temperature preferably from about one hundred and ten to one hundred and sixty degrees centigrade for preferably from about thirty minutes to one hour and thirty minutes.

The liquid resinous reaction product of the halogen containing polyhydric alcohol and the organic polyisocyanate are reacted with a hydroxyl containing polyester or polyether in the presence of a foaming agent, and optionally a reaction catalyst. The catalyst employed may be any of the known conventional catalysts for isocyanate reactions, such as tertiary amines, for example, triethylamine, N-methyl morpholine, triethanolamine, etc., or antimony compounds such as disclosed and claimed in S.N. 803,820, filed April 3, 1959, for example, antimony caprylate, antimony naphthenate or antimonous chloride. In addition, tin compounds may be employed such as disclosed and claimed in S.N. 803,819, filed April 3, 1959, for example, dibutyltin dilaurate, tri-n-octyltin oxide, hexabutylditin, tributyltin phosphate or stannic chloride. Rigid or flexible polyurethane foams are thereby obtained. The rigid polyurethane foams utilize a highly branched hydroxyl rich polyester or polyether having a hydroxyl number of between about two hundred and six hundred and fifty. The flexible polyurethane foams utilize a linear, relatively hydroxyl poor polyester or polyether having a hydroxyl number of between about thirty and one hundred. If a polyester or polyether with a hydroxyl number of between about one hundred to two hundred is employed, a semi-rigid polyurethane foam is obtained. These foamed compositions are self-curing and require no additional heat. This is a significant advantage as it allows for ease of handling and simplicity of processing. The fact that a high halogen containing foam would cure at room temperature is unexpected and surprising.

The concentration of the resinous reaction product of the halogen containing polyhydric alcohol and the organic polyisocyanate may be varied from ninety to one hundred and ten percent of isocyanato groups with respect to the sum of the hydroxyl containing polymeric material and foaming agent based on the number of hydroxyl and carboxyl groups in each.

Any foaming agent may be employed which will react with the free NCO group of the isocyanate to liberate gaseous products, in addition low boiling solvents may also be used. The preferred foaming agents are the fluorochlorocarbons boiling in the range of twenty to fifty degrees centigrade, and mixtures thereof, for example trichlorofluoromethane, trichlorotrifluoroethane, dichloromonofluoromethane, monochloroethane, monochloromonofluoroethane, difluoromonochloroethane, difluorodichloroethane, etc. Other foaming agents which may be employed include water, a tertiary alcohol and a concentrated acid such as is disclosed and claimed in U.S. 2,865,869, polymethylol phenols, dimethylol ureas, polycarboxylic compounds, and formic acid. Mixtures of any of the above foaming agents may also be used. The amount of foaming agent used is not critical, but will be dictated by the type of foam desired. If a very dense foam is desired, only a small amount need be used. If a very light foam is desired a maximum amount should be used. The amount used will also depend upon the particular foaming agent.

The polyesters employed are known in the art and are the reaction products of a polyhydric alcohol and a polycarboxylic compound. The term polycarboxylic compound is intended to include the acids, the acid anhydrides, the acid halides or the acid esters, or mixtures thereof.

It is generally desirable that at least a portion of the total polyhydric alcohol component consist of three hydroxyl groups in order to provide a means for branching; however, the ratio of dihydric alcohol to trihydric alcohol may be varied depending on the amount of branching desired. The polyhydric alcohols may be aliphatic, cycloalphatic, heterocyclic or aromatic and may be saturated or unsaturated. The alcohol may contain one or more dissimilar atoms between carbon atoms in their molecule, such as oxygen, sulfur, and the like. They may also be substituted with non-interfering substituents, such as halogen atoms, ester radicals, and the like. Illustrative polyhydric alcohols include the following: glycerol, polyglycerol; pentaerythritol; polypentaerythritol, mannitol; sorbitol; methyltrimethylolmethane; 1,4,6 - octanetriol; butanediol; pentanediol; hexanediol; dodecanediol; octanediol chloropentanediol; glycerol allyl ether; glycerol monoethyl ether; triethylene glycol; 2-ethylhexanediol-1,4; 3,3'-thiodipropanol; 4,4'-sulfonyldihexanol; 3,5-dithiahexanediol-1,6; 3,6-dithiaoctanediol-1,8; cyclohexanediol-1,4; 1,2,6-hexanetriol; 1,3,5-hexanetriol; polyallyl alcohol; 1,3-bis(2-hydroxyethoxy) - propane; 5,5' - dihydroxydiamyl ether; tetrahydrofuran-2,5-dipropanol; tetrahydrofuran-2,5-dipentanol; 2,5-dihydroxytetrahydrofuran; tetrahydrothiophene-2,5-dipropanol; tetrahydropyrrole-2,5-dipropanol; 4-hydroxy-3-hydroxytetrahydropyran; 2,5-dihydroxy-3,4-dihydro-1,2-pyran; 4,4'-sulfinyldipropanol; 2,2'-bis(4-hydroxyphenyl)-propane; 2,2'-bis - (4 - hydroxyphenyl) - methane; and the like. Preferred polyols are the open-chain aliphatic polyhydric alcohols and polyalkylene ether polyols possessing from two to four esterifiable hydroxyl groups and containing no more than twenty carbon atoms.

The polycarboxylic compounds may be aliphatic, cycloaliphatic, aromatic or heterocyclic and may be saturated or unsaturated. Illustrative polycarboxylic compounds include the following: phthalic acid; maleic acid, dodecylmaleic acid; octadecenylmaleic acid; fumaric acid; aconitic acid; itaconic acid; 3,3'-thiodipropionic acid; 4,4'-sulfonyldihexanoic acid; 3-octenedioic-1,7 acid; 3-methyl-3-decenedioic acid; succinic acid; adipic acid; 1,4-cyclohexadiene-1,2-dicarboxylic acid; 6-ethyl-1,4-cyclohexadiene-1,2-dicarboxylic acid; 3-methyl-3,5-cyclohexadiene-1,2-dicarboxylic acid; 3-chloro-3,5-cyclohexadiene-1,2-dicarboxylic acid; 8,12-eiscosadienedioic acid; 8-vinyl-10-octadecenedioic acid; and the like. Preferred polycarboxylic compounds are the aliphatic and cycloaliphatic dicarboxylic acids containing no more than fourteen carbon atoms and the aromatic dicarboxylic acids containing no more than fourteen carbon atoms.

Part or all of either the polyhydric alcohol or the polycarboxylic portion may consist of an adduct of hexahalocyclopentadiene, wherein the halogen is selected from the group consisting of chlorine, bromine, fluorine and mixtures thereof. Among the adducts of hexahalocyclopentadiene and polycarboxylic compounds which may be used are: 1,4,5,6,7,7-hexachlorobicyclo-(2.2.1)-5-heptene-2,3-dicarboxylic acid; 1,4,5,6,7,7-hexachlorobicyclo-(2.2.1)-5-heptene-2,3-dicarboxylic anhydride; 1,4,5,6,7,7-hexachloro-2-methylbicyclo-(2.2.1)-5-heptene-2,3-dicarboxylic anhydride; the mono- or di-methyl ester of 1,4,5,6,7,7-hexachlorobicyclo-(2.2.1)-5-heptene-2,3-dicarboxylic acid; 1,4,5,6-tetrachloro-7,7-difluorobicyclo-(2.2.1) - 5 - heptene-2,3 - dicarboxylic acid; 1,4,5,6,7,7 - hexachlorobicyclo-(2.2.1)-5-heptene-2-acetic-2-carboxylic anhydride; and 1, 4,5,6,7,7-hexachlorobicyclo-(2.2.1)-5-heptene-2,3 - dicarbonyl chloride which is the adduct of hexachlorocyclopentadiene with fumaryl chloride.

Among the adducts of hexahalocyclopentadiene and polyhydric alcohols which may be used are: 1,4,5,6,7,7-hexachloro-2,3-bis-hydroxymethylbicyclo-(2.2.1)-5 - heptene; and 3-(1,4,5,6,7,7-hexachlorobicyclo(2.2.1)-5-heptene-2-yl)-methoxy-1,2-propanediol; 1,4,5,6 - tetrachloro-7,7-difluoro-2,3-bis-hydroxymethylbicyclo (2,2,1) - 5 - heptene; 1,4,5,6,7,7-hexabromo-2,3-bis-hydroxymethylbicyclo-(2.2.1)-5-heptene; 3-(1,4,5,6-tetrachloro - 7,7 - difluorobicyclo-(2.2.1)-5-heptene-2-yl)-methoxy-1,2-propane diol. These compounds and the method of preparation are disclosed in copending application S.N. 308,922 for "Poly-Halogen-Containing Polyhydric Compounds," filed September 10, 1952.

The polyethers are the reaction products of either a polyhydric alcohol or a polycarboxylic acid and a monomeric 1,2-epoxide, possessing a single 1,2-epoxy group, such as, for example, propylene oxide. The polyhydric alcohols which may be employed are any of the polyhydric alcohols hereinbefore listed. The polycarboxylic acids which may be employed are any of the polycarboxylic acids hereinbefore listed. Examples of monomeric 1,2-epoxides include ethylene oxide, propylene oxide, butylene oxide, isobutylene oxide, 2,3-epoxyhexane, 3-ethyl-2,3-epoxyoctane, epichlorohydrin, epibromohydrin, styrene oxide, glycidol, decylene oxide, triphenyl glycidyl silane; allyl glycidyl ether, methyl glycidyl ether, phenyl glycidyl ether, butyl gycidyl sulfide, glycidyl methyl sulfone, glycidyl methacrylate, glycidyl acrylate, glycidyl benzoate, glycidyl acetate, glycidyl octanoate, glycidyl sorbate, glycidyl allyl phthalate, phenyl-(p-octadecyloxybenzoyl) ethylene oxide,

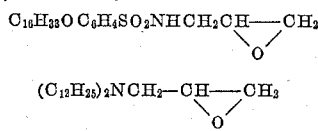

and the like. The preferred monoepoxides are the monoepoxide substituted hydrocarbons, the monoepoxy-substituted ethers, sulfides, sulfones and esters wherein the said compounds contain no more than eighteen carbon atoms.

Optionally, a low molecular weight polyhydric alcohol may be incorporated into the hydroxyl containing material in order to obtain better mechanical properties in the resultant foam. The preferred alcohols for this purpose are trimethylol propane, glycerol, ethylene glycol and diethylene glycol. Generally speaking, however, any aliphatic alcohol containing at least two hydroxyl groups may be employed.

It has been found that in some cases more desirable physical properties are obtained if a monomeric 1,2-epoxide is added to the isocyanate prior to reaction with the hexahalocyclopentadiene adduct. Any of the forementioned 1,2-epoxides may be employed.

Various additives can be incorporated which may serve to provide different properties. For instance, antimony oxide can be used to improve fire-resistance, fillers, such as clay, calcium sulfate or ammonium phosphate may be added to lower cost, and improve density and fire-resistance; ingredients such as dyes may be added for color, and fibrous glass, asbestos, or synthetic fibers may be added for strength.

The following examples are found.

EXAMPLE 1

*Resinous Reaction Product Based on 1,4,5,6,7,7-Hexachloro-2,3-bis-hydroxymethylbicyclo-(2.2.1)-5-heptene*

One hundred and seventy-five grams of 1,4,5,6,7,7-hexachloro-2,3-bis-hydroxymethylbicyclo - (2.2.1)-5-heptene was added slowly to four hundred grams of a mixture of eighty percent 2,4-tolylene-diisocyanate and twenty percent 2,6-tolylene-diisocyanate at a temperature of one hundred degrees centigrade. After the final addition, the temperature was raised to one hundred and fifteen degrees centigrade and held there for one-half hour. The product was cooled and discharged to yield a resinous composition having the following characteristics:

NCO content _____percent__ 25.6
Cl content _____do____ 17.7
Gardner viscosity at 25° C. _____seconds__ 23.7

EXAMPLE 2

*Resinous Reaction Product Based on the 1,2,4-Butanetriol Adduct of Decachlorooctahydro - 1,3,4 - Metheno-2H-cyclobuta[cd]-pentalene-2-one*

Eighty-eight grams of the 1,2,4-butanetriol adduct of decachlorooctahydro - 1,3,4 - metheno-2H-cyclobuta[cd]-pentalene-2-one was added slowly to three hundred and fifty grams of a mixture of eighty percent 2,4-tolylene-diisocyanate and twenty percent 2,6-tolylene-diisocyanate at one hundred degrees centigrade. After the final addition of the adduct the temperature was raised to one hundred and twenty degrees centigrade for one-half hour. The product was cooled and discharged to yield a resinous composition of the following characteristics:

Percent
NCO content _____ 36.2
Cl content _____ 12

Infrared analysis did not show the presence of free OH groups.

EXAMPLE 3

*Preparation of a Flexible Foam From Example 1*

To two hundred and forty-four grams polypropylene glycol having a molecular weight of about two thousand, and a hydroxyl number of fifty-six, was added five grams 1,2,6-hexanetriol, 8.5 grams water, two grams dibutyltin dilaurate and 1.5 grams silicone oil. To this mixture two hundred grams of the resinous material from Example 1 was added and stirred in rapidly. After twenty seconds mixing the mixture was poured into a mold and permitted to rise at room temperature. After rising the mold was placed in an oven at ninety degrees centigrade for fifteen minutes. The final foam was elastomeric in character, had a density of 3 lb./ft.$^3$, was self-extinguishing, and the molten material was also self-extinguishing.

EXAMPLE 4

*Preparation of a Flexible Foam From Example 2*

To two hundred grams of polypropylene glycol having a molecular weight of about two thousand and a hydroxyl number of fifty-six, was added 1.4 grams dibutyltin dilaurate, one gram silicone oil and six grams water. To this mixture was aded one hundred and two grams of the resinous material from Example 2, and the mixture stirred rapidly for twenty seconds. The mixture was then poured into a mold, permitted to rise at room temperature and finally cured at ninety degrees centigrade for fifteen minutes. The final foam was elastomeric in character, was self-extinguishing, and the molten material was also self-extinguishing.

EXAMPLE 5

*Preparation of a Rigid Foam From Example 1*

To one hundred and thirty-five grams of a polyester, comprised of five moles trimethylolpropane and three moles adipic acid condensed to an acid number less than one, and having a hydroxyl number of five hundred and four, was aded 0.3 gram dibutyltin dilaurate, 0.3 gram N-methyl morpholine and 0.7 gram silicone oil. A solution of two hundred grams of the resinous material from Example 1 and fifty grams trichlorofluoromethane was stirred rapidly into the polyester component and mixed for thirty seconds, then poured into a mold. The foam expanded at room temperature, went through a brittle stage, but cured in twenty-four hours at ambient temperatures. The final product had a density of 2.4 lb./ft.$^3$, had very fine cell structure, and was fire retardant.

EXAMPLE 6

*Preparation of a Rigid Foam From Example 2*

To one hundred and fifty grams polyester, comprised of five moles trimethylol propane and three moles adipic acid condensed to an acid number of less than one, and having a hydroxyl number of five hundred and four, was added fifty grams of the 1,2,4-butanetriol adduct of decachloro - octahydro - 1,3,4 - metheno - 2H - cyclobuta-[cd]-pentalene-2-one, 0.5 gram dibutyltin dilaurate, 0.5 gram N-methyl morpholine, and 1.0 gram silicone oil. To this mixture was added a solution of one hundred and eighty-seven grams of the resinous material of Example 2, and fifty-eight grams of trichlorofluoromethane. The mixture was stirred rapidly for twenty seconds, then poured into a mold. The foam expanded at room temperature and cured within twenty-four hours at ambient temperatures. The final product had fine cell structure and was fire retardant.

The following chart shows the preparation of various chlorine containing resinous materials of the present invention. In every case those resins which are the reaction products of hexahalocyclopentadiene and a dihydric alcohol containing aliphatic carbon-to-carbon unsaturation were prepared in a manner after Example 1 and those resins which are the reaction products of decachloro - octahydro - 1,3,4 - metheno - 2H - cyclobuta-[cd]-pentalene-2-one and a polyhydric alcohol containing at least three hydroxyl groups were prepared in a manner after Example 2. The resins are designated resins I, II and III for convenient reference.

CHART I.—CHLORINE CONTAINING RESINOUS MATERIAL

| Ex. | Resin No. | Amount of polyhydric alcohol derived from hexahalocyclopentadiene | Amount of tolylene diisocyanate, 80-20 isomeric mixture |
|---|---|---|---|
| 7 | I | 196 grams of 1,4,5,6-tetrachloro-7,7-difluoro-2,3-bis-hydroxymethylbicyclo-(2.2.1)-5-heptene. | 400 grams. |
| 8 | II | 86 grams of the adduct of glycerol and decachloro-octahydro-1,3,4,-methano-2H-cyclobuta[cd]-pentalene-2-one. | 350 grams. |
| 9 | III | Resin of Example 1. | |

The following chart shows the preparation of various hydroxyl containing materials of the present invention and the hydroxyl numbers thereof. The hydroxyl containing materials are designated hydroxyl A, B, C, D and E for convenient reference.

CHART II.—HYDROXYL CONTAINING MATERIAL

| Ex. | Hydroxyl material | Preparation | OH number |
|---|---|---|---|
| 10 | A | Hydroxyl containing material of Example 5. | |
| 11 | B | 3 parts hydroxyl material A to 1 part of the adduct of glycerol and decachloro-octahydro-1, 3, 4-metheno-2H-cyclobuta [cd]-pentalene-2-one | 640 |
| 12 | C | 5 moles of glycerol and 3 moles of adipic acid. | |
| 13 | D | Hydroxyl containing material of Example 3. | |
| 14 | E | 3 parts hydroxyl material D to 1 part of the adduct of 4 moles of propylene oxide plus 1 mole of 1,4,5,6,7,7-hexachlorobicyclo-(2.2.1)-5-heptene-2,3-dicarboxylic acid. | 82 |

The following chart shows the preparation of various polyurethane foams and properties thereof from the resins and hydroxyl containing materials in Charts I and II respectively. The rigid foams from resins I and III were prepared in a manner after Example 5, while the rigid foam from resin II was prepared in a manner after Example 6. The flexible foam from resins I and III were prepared in a manner after Example 3, while the flexible foam from resin II was prepared in a manner after Example 4.

CHART III

| Example | Amount chlorine containing resinous material | Amount hydroxyl containing material | Type | Density in pounds per cubic foot | Self-extinguishing | Molten material self-extinguishing |
|---|---|---|---|---|---|---|
| 15 | 211 grams resin I | 135 grams hydroxyl material A | Rigid | 2.7 | Yes | |
| 16 | 186 grams resin II | 200 grams hydroxyl material B | do | 2.6 | Yes | |
| 17 | 200 grams resin III | 106 grams hydroxyl material C | do | 2.3 | Yes | |
| 18 | 224 grams resin I | 244 grams hydroxyl material D | Flexible | 3.2 | Yes | Yes. |
| 19 | 102 grams resin II | 200 grams hydroxyl material D | do | 3.1 | Yes | Yes. |
| 20 | 218 grams resin III | 244 grams hydroxyl material E | do | 3 | Yes | Yes. |

The resinous reaction products of the present invention may also be used to prepare fire-resistant surface coatings, fire-resistant elastomers or synthetic rubbers and fire-resistant adhesives, see copending application S.N. 853,687, filed November 18, 1959, entitled "Resinous Compositions and Methods of Preparation," filed of even date herewith, which discloses the method of preparing these materials.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

We claim:

1. A fire-resistant cellular reaction product comprising: (I) the liquid resinous reaction product of (A) a halogen-containing polyhydric alcohol selected from the group consisting of (1) the reaction product of hexahalocyclopentadiene, wherein the halogen is selected from the group consisting of chlorine, bromine, fluorine, and mixtures thereof, and a dihydric alcohol containing aliphatic carbon-to-carbon unsaturation and (2) the reaction product of decachlorooctahydro-1,3,4-metheno-2H-cyclobuta[cd]-pentalene-2-one and a polyhydric alcohol containing at least three hydroxyl groups, and (B) an organic polyisocyanate; (II) a hydroxyl-containing polymeric material having a hydroxyl number of between thirty and six hundred and fifty, selected from the group consisting of (A) a polyester comprising the reaction product of a polyhydric alcohol and a polycarboxylic compound, (B) a polyether comprising the reaction product of a monomeric, 1,2-monoepoxide and a compound selected from the group consisting of a polyhydric alcohol and a polycarboxylic acid, and (C) mixtures thereof; and (III) a foaming agent; said liquid reaction product being present in an amount sufficient to provide ninety to one hundred and ten percent of isocyanato groups with respect to the total number of hydroxyl and carboxyl groups present in the hydroxyl containing polymeric material and the foaming agent.

2. The fire resistant cellular reaction product of claim 1 wherein the halogen-containing polyhydric alcohol is the reaction product of hexahalocyclopentadiene and a dihydric alcohol containing aliphatic carbon-to-carbon unsaturation.

3. The fire resistant cellular reaction product of claim 1 wherein the halogen-containing polyhydric alcohol is the reaction product of decachlorooctahydro-1,3,4-metheno-2H-cyclobuta[cd]-pentalene-2-one and a polyhydric alcohol containing at least three hydroxyl groups.

4. The fire resistant cellular reaction product of claim 2 wherein the halogen-containing polyhydric alcohol is 1,4,5,6,7,7 - hexachloro - 2,3-bis-hydroxymethylbicyclo-(2.2.1)-5-heptene.

5. The fire resistant cellular reaction product of claim 3 wherein the halogen-containing polyhydric alcohol is the reaction product of decachlorooctahydro-1,3,4-metheno-2H-cyclobuta[cd]-pentalene-2-one and 1,2,4-butanetriol.

6. The fire resistant cellular reaction product of claim 1 wherein said hydroxyl containing polymeric material has a hydroxyl number of between two hundred and six hundred and fifty.

7. The fire resistant cellular reaction product of claim 1 wherein said organic polyisocyanate is tolylene diisocyanate.

8. The fire resistant cellular reaction product of claim 1 wherein said organic polyisocyanate is a mixture of 2,4-tolylene diisocyanate and 2,6-tolylene diisocyanate.

9. The process for preparing a fire-resistant cellular reaction product which comprises adding a halogen-containing polyhydric alcohol selected from the group consisting of (1) the reaction product of hexahalocyclopentadiene, wherein the halogen is selected from the group consisting of chlorine, bromine, fluorine and mixtures thereof, and a dihydric alcohol containing aliphatic carbon-to-carbon unsaturation and (2) the reaction product of decachlorooctahydro-1,3,4-metheno-2H-cyclobuta[cd]-pentalene-2-one and a polyhydric alcohol containing at least three hydroxyl groups to an organic polyisocyanate to form a liquid resinous reaction product; and thereafter mixing said liquid product with a hydroxyl-containing polymeric material having a hydroxyl number of between thirty and six hundred and fifty, selected from the group consisting of (A) a polyester comprising the reaction product of a polyhydric alcohol and a polycarboxylic compound, (B) a polyether comprising the reaction product of a monomeric 1,2-monoepoxide and a compound selected from the group consisting of a polyhydric alcohol and a polycarboxylic acid, and (C) mixtures thereof, in the presence of a foaming agent; said liquid product being used in an amount sufficient to provide ninety to one hundred and ten percent of isocyanato groups with respect to the total number of hydroxyl and carboxyl groups present in the hydroxyl-containing polymeric material and the foaming agent.

10. The process according to claim 9 wherein the halogen-containing polyhydric alcohol is 1,4,5,6,7,7-hexachloro-2,3,-bis-hydroxymethylbicyclo-(2.2.1)-5-heptene.

11. The process according to claim 9 wherein the halogen-containing polyhydric alcohol is the reaction product of decachlorooctahydro-1,3,4-metheno-2H-cyclobuta[cd]-pentalene-2-one and 1,2,4-butane triol.

No references cited.